(12) United States Patent
Welch (10) Patent No.: US 8,516,090 B1
(45) Date of Patent: Aug. 20, 2013

(54) METHOD AND APPARATUS FOR DISTRIBUTING LICENSES

(75) Inventor: William Welch, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 328 days.

(21) Appl. No.: 12/495,815

(22) Filed: Jul. 1, 2009

(51) Int. Cl.
*G06F 15/177* (2006.01)

(52) U.S. Cl.
USPC .............. 709/221; 709/226; 709/223

(58) Field of Classification Search
USPC ........................... 709/221, 226, 223
See application file for complete search history.

(56) References Cited

U.S. PATENT DOCUMENTS

| | | | | |
|---|---|---|---|---|
| 7,716,348 B1 * | 5/2010 | Redding et al. | | 709/229 |
| 2004/0010440 A1 * | 1/2004 | Lenard et al. | | 705/10 |
| 2007/0265976 A1 * | 11/2007 | Helfer et al. | | 705/59 |
| 2008/0082450 A1 * | 4/2008 | Grimm et al. | | 705/59 |
| 2008/0215468 A1 * | 9/2008 | Monsa-Chermon et al. | ... | 705/34 |
| 2009/0132310 A1 * | 5/2009 | Shear et al. | | 705/7 |

* cited by examiner

*Primary Examiner* — Nicholas Taylor
(74) *Attorney, Agent, or Firm* — Park, Vaughan, Fleming & Dowler, LLP (57) ABSTRACT

A method and apparatus are provided for distributing or redistributing licenses from a failed or unavailable license controller to one or more backup license controllers. Each controller has an initial count of licenses it can serve or allocate to clients desiring access to licensed electronic content. Each controller maintains a set of data that identifies the initial license counts and that also identifies backup relationships between controllers. Each such relationship for a given controller identifies which controllers will inherit licenses if the given controller becomes unavailable, and how many (e.g., a percentage) of the given controller's license that will be inherited. A redistribution plan for a given controller may have multiple levels, wherein a subsequent level may be applied only if all controllers designated as backups in the preceding level are also unavailable.

15 Claims, 8 Drawing Sheets

METHOD AND APPARATUS FOR DISTRIBUTING LICENSES

FIELD

The present invention relates to computer systems in general, and in particular to methods of distributing licenses.

BACKGROUND

Client licenses for an application, utility or other computer program may be purchased in bulk in some computing environments. For example, a company or other organization may provide a licensed program to employees for use on multiple different computing devices, which may be stationary (e.g., desktop computers, workstations) and/or mobile (e.g., personal digital assistants, laptop computers). Typically, for every license the organization owns, its employees can actively use one copy of the program.

In some computing environments, each individual license is loaded or installed on a particular device, and thus is only exercised when the program is executed on that device. This lack of portability inhibits redistribution or reallocation of the organization's licenses as employees migrate within the organization (or leave), and complicates the replacement or upgrade of existing computing equipment.

To alleviate problems associated with such static licensing schemes, licenses for some programs may reside or be installed on one or more controllers or computer servers, and be allocated to users as needed (e.g., on demand). In these environments, the licenses are dynamically assigned when clients boot or start the associated program, and returned to the controllers when not in use. These computing environments are more flexible, in that any client or user can employ any of the organization's licenses, up to the maximum number of licenses owned by the organization.

However, if all licenses are loaded on one controller or licensing server, and it fails or otherwise becomes unavailable, all users may lose access to the program. Even if multiple controllers are employed, with each controller responsible for allocating a separate pool of the organization's licenses, use of a subset of the licenses may be lost in the event a controller becomes unavailable.

SUMMARY

In embodiments of the invention, a method and apparatus are provided for distributing or redistributing licenses from a failed or unavailable license controller to one or more backup license controllers.

In these embodiments, each controller has an initial count of licenses it can serve or allocate to clients that desire access to licensed electronic content, and possibly a maximum count of licenses they can serve. Every controller maintains a set of data that identifies the controllers' initial license counts (and possibly maximum counts), and backup relationships between the controllers.

Each backup relationship for a given controller identifies which controllers will inherit licenses if the given controller becomes unavailable, and how many (e.g., an absolute number, a percentage) of the given controller's license that will be inherited. A redistribution plan for a given controller may have multiple levels, wherein a subsequent level may be applied only if all controllers designated as backups in the preceding level are also unavailable.

If a specified backup node cannot accept the portion of a failed node's licenses specified in a plan, the licenses it cannot inherit may be distributed among the other backup nodes. Similarly, if a backup node becomes unavailable after inheriting licenses from a failed node, the licenses it had inherited may be distributed among other surviving nodes identified in the same distribution plan. If there are no such survivors, a different plan (e.g., a lower-level plan in a multi-level plan) may be adopted to distribute the original failed node's licenses.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, methods and apparatus are provided for distributing licenses and/or for redistributing licenses among surviving members of a set of license controllers after one fails or becomes unavailable. The licenses may pertain to any type of computer program or other electronic content, and may be allocated on demand to any compatible computing/communication devices (e.g., computers, personal digital assistants).

In these embodiments, a surviving license controller within a set of controllers absorbs some percentage (0 to 100%) or number of a failed controller's pool of licenses and makes them available to clients. If and when the failed controller comes back online, it will rejoin the other controllers and recoup the number of licenses it managed before becoming unavailable.

An unavailable controller's licenses are distributed in a manner that accommodates other controllers' shortcomings. For example, if a given surviving controller has a limit as to how many clients it can support before suffering an appreciable loss in performance (e.g., due to a lack of resources), the number of licenses temporarily allocated to that controller during the unavailability of its peer may be limited accordingly.

To enable effective and efficient license distribution or redistribution, each cooperating controller maintains data that allow it to compute the number of licenses it should offer for use. This data identifies each controller's current state (e.g., online or offline), and includes a baseline configuration that reveals how many licenses each controller should manage when all controllers are online. For each controller, the data also indicates which controller or controllers will act as backups to inherit licenses from a failed controller, and how many (or what percentage) of the failed controller's license go to each specified backup controller. When a controller learns of the failure of a peer, it re-computes its maximum license count as necessary and begins serving them.

In some embodiments of the invention, a controller may learn of a peer's failure first-hand by issuing regular queries to some or all peers, especially those from whom it is designated to inherit licenses. The queries may comprise keep-alive messages or other comparable communications. In other embodiments, one or more designated entities may monitor controller statuses and notify surviving controllers when a peer has become unavailable. Any feasible method of monitoring or determining a computer system's status may be used to detect failure of a node without exceeding the scope of the invention.

Figure 1:
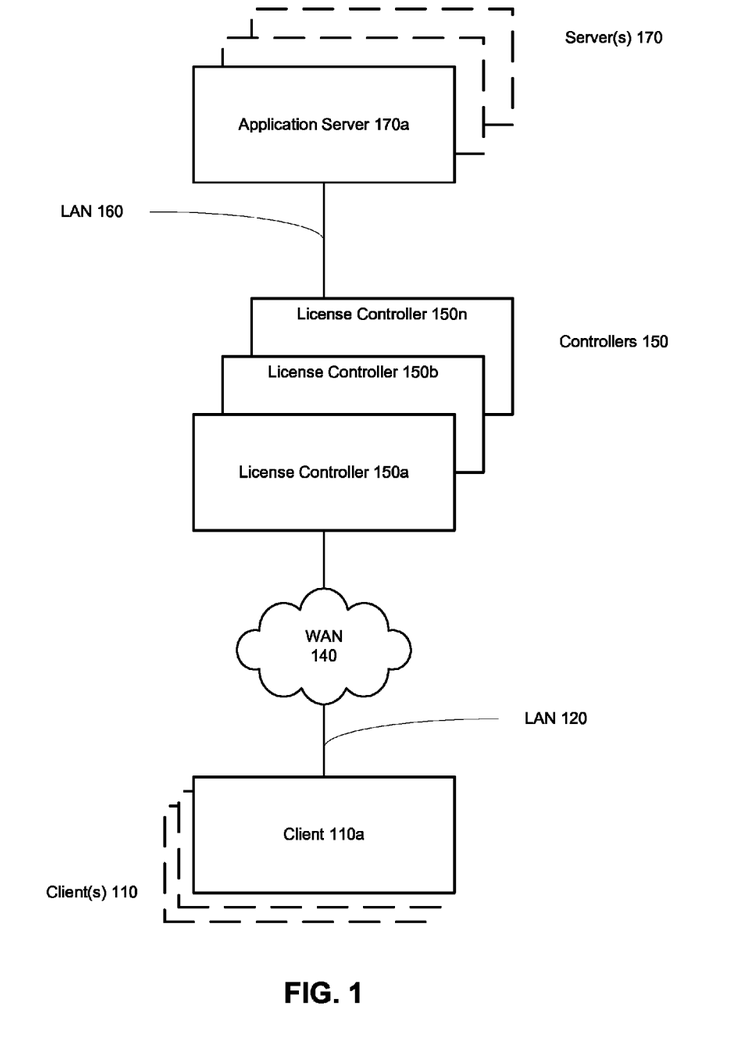
FIG. 1 is a block diagram depicting an environment in which a license failover scheme may be applied to redistribute a failed controller's pool of licenses among one or more other controllers, according to some embodiments of the invention.

FIG. 1 illustrates an environment in which licenses for a program or other content are served from a plurality of license controllers and redistributed among the controllers when one becomes unavailable, according to some embodiments of the invention.

In the environment of FIG. 1, clients 110 (e.g., client 110a) include any number and type of computing devices capable of executing the licensed program. The program is served to the clients from application servers 170 (e.g., server 170a), of which there may be any number. License controllers 150 (e.g., controllers 150a, 150b, 150n) serve or allocate program licenses as needed, as clients request access to the program. Upon startup, each controller has a default or initial number of licenses that it can allocate.

Clients 110 are coupled via LAN (Local Area Network) 120 to WAN (Wide-Area Network) 140, which may comprise the Internet, while application servers 170 are coupled to license controllers 150 via LAN 160. In other embodiments of the invention, communication links of any type and capacity may be employed.

When a client attempts to execute the licensed program, a request is issued to one or more of the license controllers. The controllers may operate as a cluster, and take turns responding to user requests through load-balancing, or may operate according to some other scheme.

One controller, which may be selected or designated based on some client characteristic (e.g., address, device type, location), identity of the user operating the client, or some other factor, issues to the requesting client a license from its pool as long as it has not already allocated its maximum number of licenses.

Figure 7:
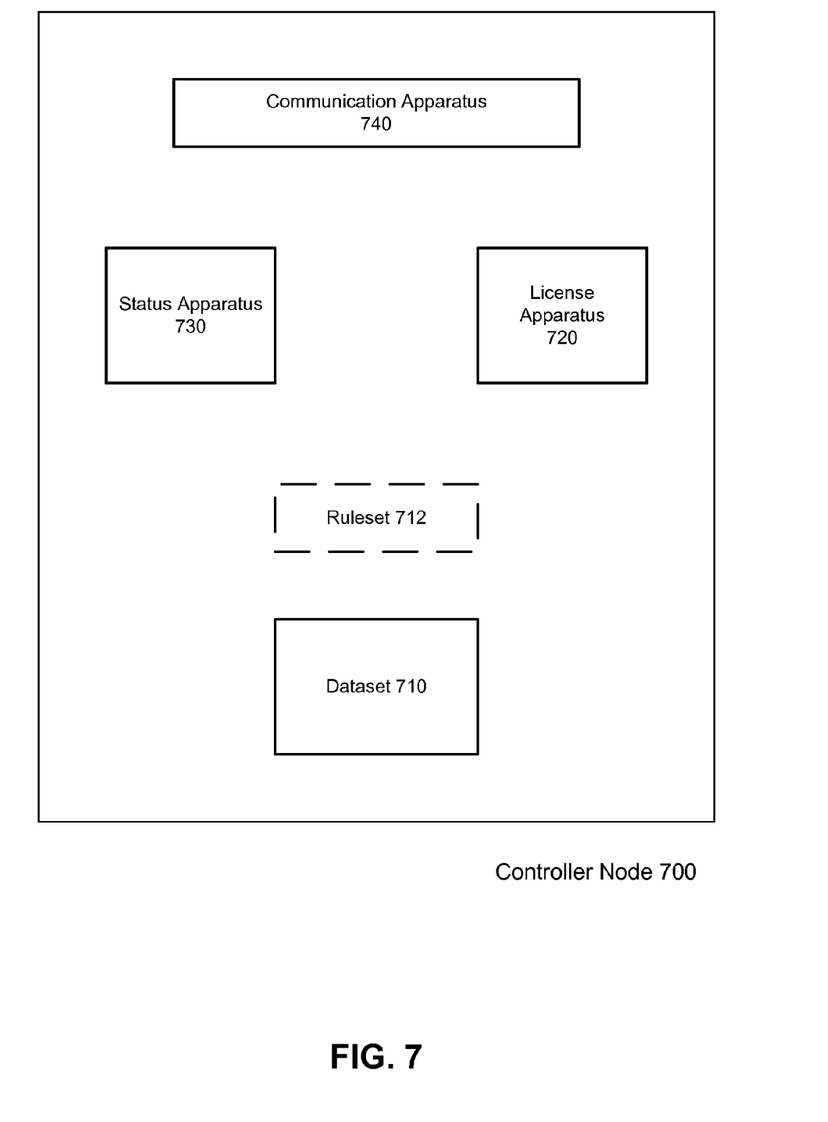
FIG. 7 is a block diagram of apparatus for redistributing a failed controller's pool of licenses among other controllers, according to some embodiments of the invention.

Controller node 700 of FIG. 7 comprises dataset 710, optional ruleset 712, license apparatus 720, status apparatus 730 and communication apparatus 740. Any or all of these components may be combined or subdivided in other embodiments of the invention.

Other network entities may be interposed between clients 110 and application servers 170 without affecting operation of embodiments of the invention described herein, such as a firewall, a gateway, a router, and so on. In particular, in some implementations client-server communications may be improved through the introduction of an optimizer or accelerator offered by Riverbed Technology, Inc.

For example, a WAN accelerator that optimizes network traffic may be employed to improve network performance in transporting, reading and/or writing data over a network. WAN accelerators are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or protocol optimizers.

Additionally, techniques for optimizing network traffic to improve network performance in transporting, reading and/or writing data over a network are referred to in the art by many different terms, including, but not limited to, WAN acceleration, transaction acceleration, transaction pipelining, protocol pipelining, request prediction, application flow acceleration and protocol acceleration.

In some embodiments of the invention, data maintained by license controllers 150 for aiding in redistribution of a controller's license when that controller becomes unavailable may include a matrix, spreadsheet, list or other structure comprising the information described herein.

For each controller node i, represented herein as $N_i$, the data includes the node's initial or default license count; this initial value may be represented as L. For each node $N_i$, the data will also contain a set of weighted directed arcs connecting that node to each backup node that will inherit some portion of node $N_i$'s license in the event $N_i$ fails.

A directed arc may be represented herein as $(N_i, N_j, X)$, which signifies that in the event node $N_i$ becomes unavailable, node $N_j$ will receive X of $N_i$'s initial license count $L_i$. X is the weight of the arc, and in some embodiments of the invention represents a percentage (i.e., between 0 and 100) of $N_i$'s licenses, in which case the total weight of all directed arcs from a given node $N_i$ should equal 100%. The weight of a directed arc from node $N_i$ to node $N_j$ may alternatively be represented as $W_{ij}$.

In some alternative embodiments of the invention, X may be an absolute number (i.e., between 0 and $L_i$). The total weight of all directed arcs from a given node $N_i$ should equal $L_i$ in these embodiments of the invention.

Some support relationships may be one-way, meaning that although a node $N_j$ inherits some of node $N_i$'s license, $N_i$ does not inherit from $N_j$. Other relationships may be bidirectional. The weights of bidirectional directed arcs need not be equivalent.

When a node $N_f$ fails or becomes unavailable, as each surviving node $N_s$ that is to inherit licenses from node $N_f$ determines that $N_f$ is unavailable, it calculates how many licenses it inherits by multiplying $L_f$ by the weight of the directed arc $(N_f, N_s, X)$. It then increases the current maximum number of licenses it can allocate (e.g., $L_s$ or whatever value it was able to allocate before $N_f$'s failure) by $L_f * X$.

In an alternative embodiment of the invention in which weight X represents an absolute number of licenses (instead of a percentage), each surviving beneficiary node $N_s$ augments its current maximum number of allocable licenses by the weight of the directed arc.

It may be possible that the number of licenses a surviving backup or beneficiary node would be entitled to allocate after a peer node fails exceeds a maximum number the node is permitted or capable of allocating. Illustratively, a node may be restricted from serving more than a threshold number of licenses because it does not have sufficient resources or processing power to support additional clients or communication sessions, because of restrictions in the organization's licensing agreement, or for some other reason.

In this situation, the excess licenses (those exceeding the beneficiary node's maximum) may be distributed among the other surviving beneficiaries (if there are any), or may be temporarily lost until the failed node comes back online. If they are distributed among the other beneficiaries, they may be distributed evenly, may be distributed in accordance with the weights of the directed arcs from the failed node to the beneficiary nodes, or may be distributed according to some other scheme.

If a designated backup or beneficiary node is unavailable when the peer node that it supports fails, the designated node's specified inheritance may be distributed similarly. For example, the specified inheritance may be distributed among other surviving beneficiaries according to the weights of their original directed arcs from the failed node. That is, the weights of the surviving backup nodes' directed arcs may be re-normalized so as to distribute the failed nodes among the surviving nodes with equivalent or similar proportions.

Because each node maintains a dataset identifying initial license pools and all directed arcs between nodes, as well as any rules for distributing or redistributing licenses among surviving nodes, each node should be capable of determining a current distribution pattern (i.e., how many licenses each node is allocating) at any given time. This may facilitate a recovery period after a failed node comes back online, at which time backup nodes that inherited licenses from that node must decrease their maximums to offset the returning node's resumption of licensing activity.

In some embodiments of the invention, multi-level redistribution plans may be implemented. A multi-level redistribution plan provides for alternative redistribution of a failed node's licenses in the event a preferred set of backup or beneficiary nodes is unavailable.

Thus, a first or top-level plan may specify a first preference for how to redistribute licenses of a failed or unavailable node. Only if all designated first-level backups/beneficiaries are also unavailable will a second-level plan be implemented. Second-level (and subsequent level) plans may be configured similarly to first-level plans, in that each backup or inheritance relationship is defined by a directed arc.

Figure 2:
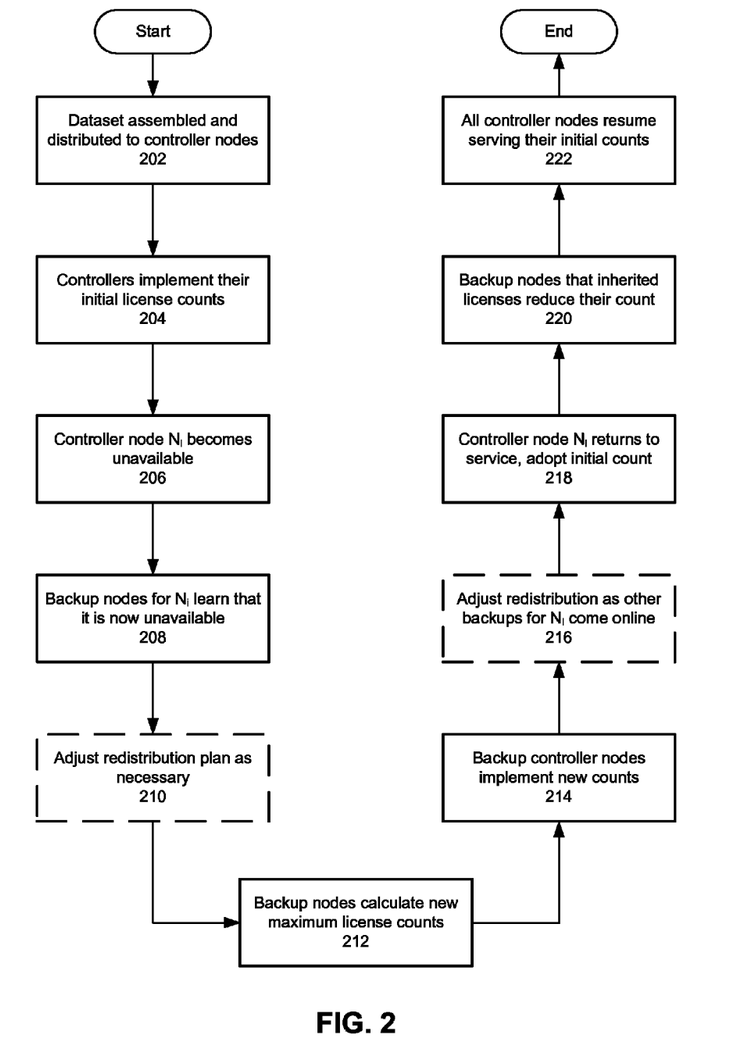
FIG. 2 is a flowchart illustrating one method of redistributing a failed controller's pool of licenses among other controllers, in accordance with some embodiments of the invention.

FIG. 2 is a flowchart demonstrating a method of redistributing licenses for electronic content after failure or unavailability of one of a plurality of controller nodes responsible for serving or allocating the licenses, according to some embodiments of the invention. Other methods may be derived from the associated description without exceeding the scope of the invention.

In operation 202, a dataset that specifies the size of each controller node's default license pool and identifies backup or inheritance relationships among the nodes is distributed among the controllers. In one implementation, the dataset may comprise a two-dimensional matrix or array that maps each node to each other node.

Node addresses, serial numbers or other identifiers may be used as matrix indices, and a cell that marks the intersection between one node and another node within the matrix will contain the percentage or absolute number of licenses that the other node inherits in the event the one node becomes unavailable (i.e., the weight of the directed arc from the one node to the other node). If the value in the cell is zero, then the other node is not a backup for the one node.

Each node's initial or default license count may be stored in each cell containing a non-zero inheritance (e.g., so that a backup can calculate how many licenses it inherits without having to retrieve the initial license count from elsewhere), or the initial counts may be stored in separate cells or in a different data structure.

If a multi-level plan for redistribution is implemented, to cover the eventuality of all of a given node's primary beneficiaries also being unavailable when the given node becomes available, the dataset may comprise an M-dimensional matrix (M>2). Each additional dimension specifies how to redistribute the failed node's licenses in such a circumstance.

Specifically, if all first-level backup/beneficiary controller nodes are unavailable, the matrix dimension associated with a second-level redistribution plan is applied, which should identify at least one backup or beneficiary node not included in the first-level plan. If all second-level backup controller nodes are also unavailable, then a third-level plan may be adopted, and so on.

In the illustrated embodiments of the invention, only one level of the plan is implemented for any node failure, and remains in force until the original failed/unavailable node comes back online, until a different dataset is implemented or until the controller nodes are rebooted. In the latter case, it may still be determined that the original failed node is unavailable, but a higher-level redistribution plan may be able to be implemented at this time if one or more nodes specified as beneficiaries in that plan are now available.

In operation 204, the controller nodes implement their specified default license counts. In particular, at startup, each node begins serving or allocating its initial number of licenses for the electronic content. Each time a client request for a license or access to the licensed content is directed to the node, it serves a license to the client (unless prohibited by some access rule), until it has allocated all of its licenses. As clients shutdown or close the content, their licenses are returned to the node from which they were allocated.

In operation 206, a controller node $N_i$ fails or becomes unavailable. For example, the node may crash, a communication link to the node may be severed, or some other error may occur.

In operation 208, nodes that will inherit licenses from controller node $N_i$ learn of its unavailability. In one implementation, as controller nodes become aware of the failure of $N_i$, they examine the redistribution plan (e.g., the dataset) to identify the designated first-level backup nodes, and determine whether at least one of those designated backups is online.

Each level of the plan is examined in turn until one is found that names as a backup for $N_i$ at least one node that is currently available. Because controllers monitor each others' statuses, this allows every node to know which level of the plan is to be implemented.

In optional operation 210, the applicable redistribution plan is adjusted as necessary to reflect the current status of the surviving beneficiary nodes. Various adjustments may be required. For example, if one or more of the surviving beneficiaries cannot accept all of the licenses that the plan allocates to them (e.g., because of resource constraints that prohibit a backup node from supporting more than a threshold number of clients), the applicable percentages allocated to each survivor may be adjusted.

If $N_i$'s licenses cannot be fully reallocated among the surviving backup controller nodes, any excess licenses will be lost until $N_i$ comes back online, until another designated backup node in the same level of the plan comes back online or until some other change to the dataset is implemented.

In operation 212, each surviving beneficiary node in the applicable level of the plan calculates the new maximum number of licenses it can allocate or serve to clients. As described above, this may entail multiplying $N_i$'s initial license count $L_i$ by a percentage specified in the dataset, or by an adjusted percentage as described above.

In operation 214, beneficiaries of controller node $N_i$ adopt their new maximum license counts. This allows them to allocate additional licenses to clients.

In optional operation 216, the redistribution plan may or may not be adjusted if a backup or beneficiary controller node that was designated in the applied level of the redistribution plan, but which was offline when $N_i$ failed, now comes back online. Similarly, if a second-level plan or lower was applied, and a designated backup/beneficiary for $N_i$ in a top-level plan comes back online, licenses may or may not be redistributed.

In the illustrated embodiments, once a redistribution or inheritance plan is applied, it is not changed unless or until the original node ($N_i$) comes back online or is removed from the set of controller nodes (and a new dataset with new default license counts and redistribution plans is applied).

However, if a controller node $N_f$ that has inherited licenses from node $N_i$ fails, and at least one other backup for $N_i$ still survives, the licenses inherited by $N_f$ from $N_i$ will be redistributed among $N_i$'s other surviving beneficiaries. In particular, as those other survivors learn of $N_f$'s unavailability, they will renormalize the weights of directed arcs from $N_i$ to account for $N_f$'s absence and adjust their maximum license counts accordingly.

Note that newly failed node $N_f$'s normal license load (i.e., $L_f$) may also be redistributed among other surviving nodes, in accordance with the applicable plan.

In operation 218, controller node $N_i$ returns to service and computes the number of licenses it should be serving, based on the up/down state of other controllers. This value may be greater than or equal to its specified initial license count L. Other controller nodes will learn of its return directly or indirectly, similar to the manner in which they learned of its unavailability.

In operation 220, controller nodes that inherited additional licenses when $N_i$ became unavailable adjust their maximum licenses counts downward by the number of licenses they inherited. This may return them to their initial counts or to some other count that includes licenses inherited from another unavailable node.

If a backup node's new maximum license count is now lower than the number it has currently allocated to clients, it will not be able to allocate any more licenses until its number of outstanding licenses falls below its maximum allocable.

In the illustrated embodiments of the invention, the total number of licenses for the content that can be allocated to clients across all controller nodes is permitted to temporarily exceed a maximum that is applied initially (i.e., when all controller nodes first start up). In other embodiments, a different scheme may be applied when a failed/unavailable node returns to service.

For example, when node $N_i$ returns to service, it may not be immediately permitted to serve its initial license count L. Instead, its beneficiaries may immediately adjust their maximums downward, and node $N_i$ may only be able to serve as many licenses as can be recouped from those beneficiaries. Thus, in this scheme, the number of licenses that node $N_i$ can allocate increases over time (toward L) as it retrieves them from the beneficiaries. However, node $N_i$ must know or be able to determine the current number of clients being served by other nodes.

In operation 222, all controller nodes return to serving a maximum number of licenses equivalent to their initial license counts. The illustrated method ends after operation 222.

In embodiments of the invention described herein, an unavailable node's licenses do not move more than one hop. That is, if some number X of licenses is redistributed from controller node $N_i$ to node $N_j$ when node $N_i$ becomes unavailable, they will not be further redistributed from node $N_j$ (e.g., to a node $N_k$ that is a beneficiary of $N_j$) if $N_j$ fails and $N_i$ is still unavailable, except to the extent that other beneficiaries of $N_i$ in the same level redistribution plan are available (as described above).

However, in other embodiments of the invention, licenses may indeed be able to move more than one hop. This may require modifying the dataset to store additional data for each controller, such as one or more incremental license counts that exceed its initial count (to reflect inherited licenses), plus information identifying which nodes it inherited licenses from, how many licenses it inherited from each such node, etc. The cost of tracking this data and programming the license redistribution plan may exceed the value it provides, unless it is essential to maintain availability of all licenses.

Figure 3A:
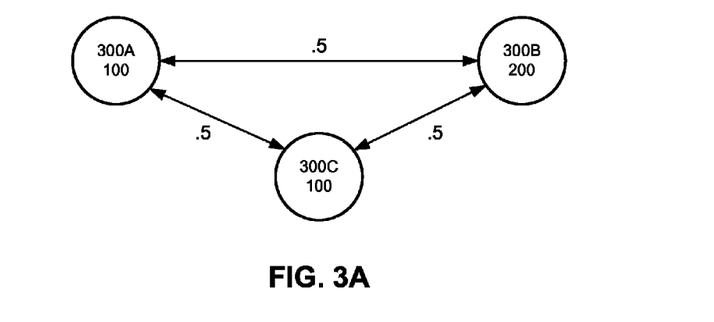
FIGS. 3A-3C depict a plan for redistributing licenses among a set of controller nodes, according to some embodiments of the invention.
Figure 3B:
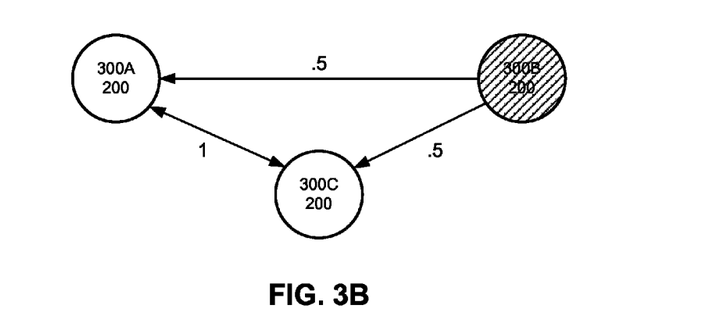
Figure 3C:
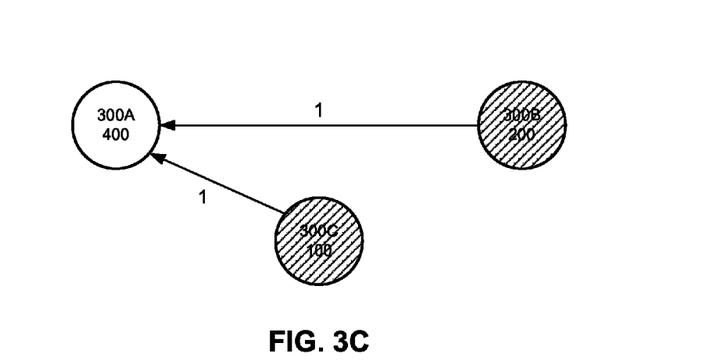

FIGS. 3A-3C illustrate a set of controller nodes among which licenses may be redistributed according to some embodiments of the invention. The illustrated backup relationships may represent only one level of a multi-level redistribution plan.

As shown in FIG. 3A, nodes 300A, 300B and 300C have initial license counts of 100, 200 and 100, respectively. The nodes have symmetric bidirectional backup relationships, in that if any node becomes unavailable, its licenses are split evenly among the survivors. Thus, the weight of each directed backup arc is 0.5 in both directions, which represents 50%.

In FIG. 3B, node 300B has failed or otherwise become unavailable, and so its 200 licenses are shared equally among nodes 300A, 300C according to the weights of the directed arcs. Each survivor now implements a maximum license count of 200.

In addition, the weight of the symmetric directed arc between nodes 300A and 300C may be increased to 1, because each must now inherit 100% of the other's licenses should it fail. Illustratively, the arc may be updated from 0.5 to 1 when failure of node 300B is detected and it is realized that nodes 300A and 300C must now rely on each other for full backup, or may be updated by default if/when either of these two nodes fails.

FIG. 3C demonstrates further redistribution of licenses in the event one of node 300B's survivors fails. In particular, if node 300C fails, node 300A inherits node 300C's initial license count (100) and, in addition, the distribution of node 300B's 200 licenses is adjusted to grant them all to node 300A.

Note that in some embodiments of the invention, if there was no directed arc from node 300B to node 300A in FIG. 3A, node 300B's 200 licenses would be unavailable after node 300C failed—at least until either of node 300B and node 300C returned to service.

Figure 4A:
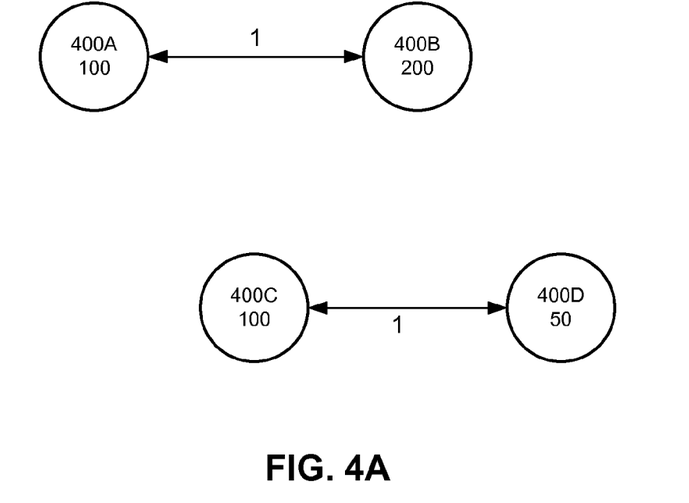
FIGS. 4A-4B depict a license redistribution plan in which cooperating controller nodes are organized into backup pairs, according to some embodiments of the invention.
Figure 4B:
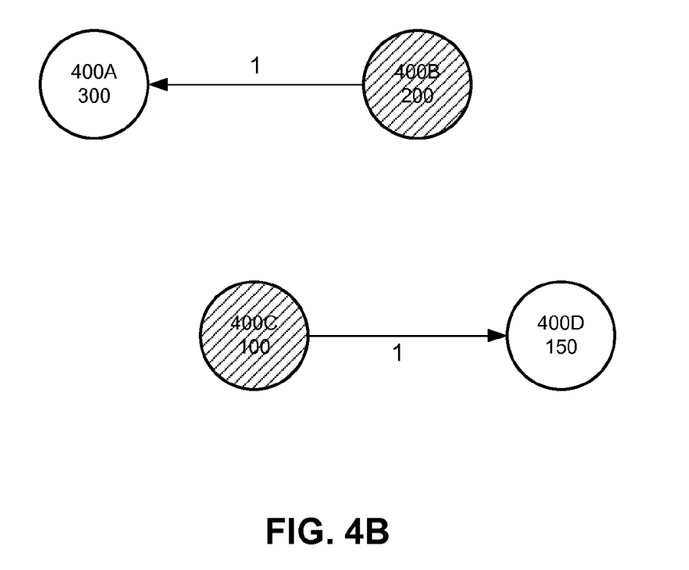

FIGS. 4A-4B depict another example of license redistribution according to some embodiments of the invention. In this example, cooperating controller nodes are organized into backup pairs, wherein each illustrated node is backed up by just one other node. As described elsewhere, however, one or more additional levels of a distribution plan encompassing the illustrated nodes may be defined to cover a circumstance in which all primary backup nodes are unavailable.

As shown in FIG. 4A, nodes 400A, 400B, 400C and 400D have initial license counts of 100, 200, 100 and 50, respectively. FIG. 4A reflects the primary backup plan, wherein nodes 400A, 400B have symmetric bidirectional directed arcs, and nodes 400C, 400D have the same type of relationship. FIG. 4B demonstrates how all of a failed node's licenses (e.g., for nodes 400B, 400C) are distributed to their backups.

Figure 5A:
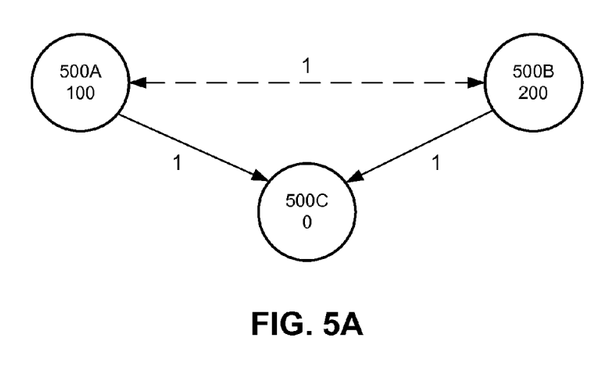
FIGS. 5A-5C illustrate a more complex, multi-level plan for redistributing licenses according to some embodiments of the invention.
Figure 5B:
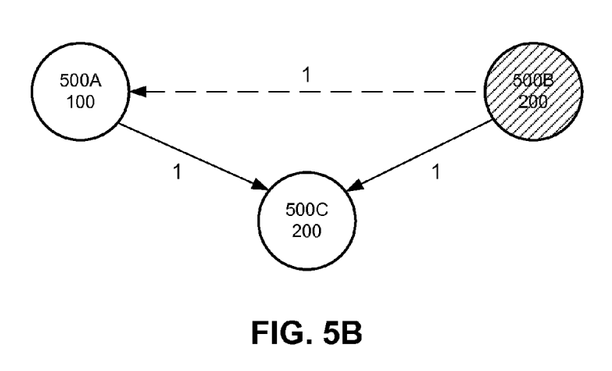
Figure 5C:
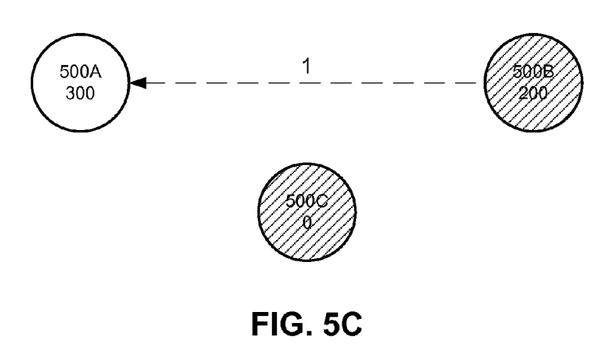

FIGS. 5A-5C illustrate a more complex, multi-level plan for redistributing licenses according to some embodiments of the invention. In these embodiments, a second-level distribution plan is applied for a given node failure if all first-level backups for the node are unavailable at the same time the given node is unavailable.

As shown in FIG. 5A, nodes 500A and 500B have initial license counts of 100 and 200, respectively. Controller node 500C has an initial license count of 0. As this initial license count and the unidirectional directed arcs from nodes 500A and 500B reflect, node 500C primarily acts as a standby controller to pick up and allocate licenses on behalf of either or both of nodes 500A, 500B.

In particular, unidirectional directed arcs exist from those nodes to node 500C, with weights of 1 (100%). The dashed line between nodes 500A and 500B represents a second-level directed arc, which is bidirectional and weighted at 1 (100%).

In the environment of FIG. 5A, a first-level license redistribution plan specifies that all licenses of nodes 500A and/or 500B are to be shifted to node 500C in the event of a failure. However, if their first-level backup node (i.e., node 500C) is unavailable, then their licenses are to migrate to each other.

FIG. 5B demonstrates unavailability of node 500B. Because node 500C is available, it inherits all 200 of node 500B's licenses.

However, as shown in FIG. 5C, if node 500C were to be unavailable at the same time node 500B is unavailable, then the second-level distribution plan comes into effect for node 500B, and all 200 licenses move to node 500A.

Figure 6A:
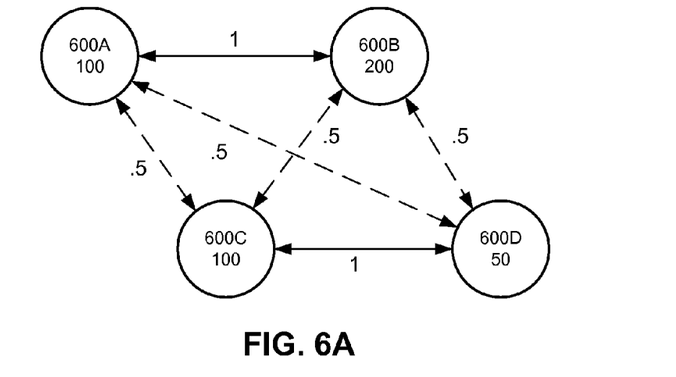
FIGS. 6A-6C demonstrate implementation of a multi-level plan for redistributing licenses according to some embodiments of the invention.
Figure 6B:
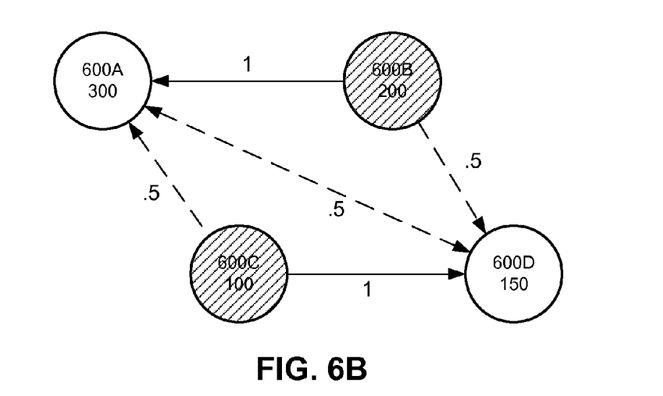
Figure 6C:
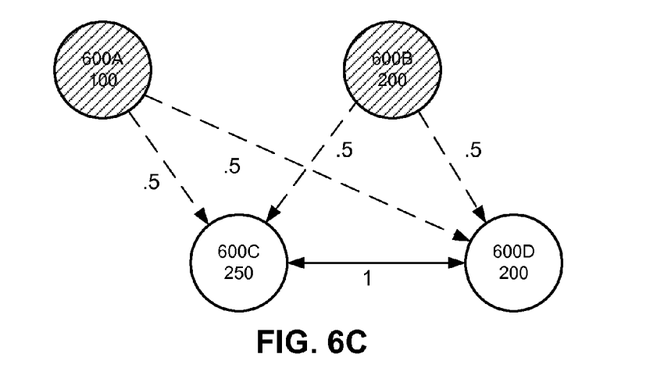

FIGS. 6A-6C also demonstrate implementation of a multi-level plan for redistributing licenses according to some embodiments of the invention.

As shown in FIG. 6A, nodes 600A, 600B and nodes 600C, 600D have first-level redistribution plans with each other (as in FIGS. 4A-4B). If one node in a pair fails, all licenses of the failed node migrate to the paired node.

However, the dashed lines indicate that second-level plans exist to distribute a failed node's licenses differently if both nodes in one backup pair are unavailable at the same time. In particular, nodes 600A, 600B have symmetric bidirectional second-level directed arcs with nodes 600C, 600D.

FIG. 6B illustrates failure of one node in each pair. All of failed node 600B's licenses are absorbed by node 600A, while all of failed node 600C's licenses migrate to node 600D.

FIG. 6C illustrates failure of an entire backup pair (nodes 600A, 600B). Without a multi-level plan, all 300 licenses managed by the two nodes would be lost until one or both of them came back online.

However, in FIG. 6C the second-level license redistribution plan is put into effect to split each of the failed nodes' licenses among the two designated nodes. Thus, each of node 600C and node 600D receives 50 of node 600A's licenses and 100 of node 600B's.

FIG. 7 is a block diagram of hardware apparatus that may be employed to facilitate distribution or redistribution of a pool of licenses among a set of license controllers when one controller becomes unavailable, according to some embodiments of the invention.

Although FIG. 1 reflects an environment in which license controllers are separate from application servers, in other embodiments of the invention a license controller may be co-located on a computer system that also serves or makes available the program or other content that is licensed.

Dataset 710 comprises data for facilitating distribution of the licenses, and may include initial license counts, directed arcs describing how a given node's pool of licenses should be distributed if it becomes available, status information for controller nodes, etc.

Optional ruleset 712 comprises a set of rules for facilitating license distribution if such rules are not embedded within dataset 710. For example, ruleset 712 may comprise rules indicating an order in which different levels of a multi-level license distribution plan may be applied, whether a given node's licenses may migrate more than one hop, and so on.

As described above, limiting inheritance of licenses to one hop means that licenses inherited by a beneficiary $N_i$ from a failed node $N_f$ will not be further passed to a beneficiary $N_j$ of $N_i$ if/when $N_i$ fails. However, if beneficiary $N_j$ is also a beneficiary of $N_f$ in the same plan in which $N_i$ inherited from $N_f$, then it may indeed receive some of the licenses that had passed from $N_f$ to $N_i$. However, this occurs as part of the implementation of the plan for redistributing licenses from original failed node $N_f$, not as a second order inheritance from $N_i$.

License apparatus 720 is configured to issue or allocate licenses for one or more items of licensed electronic content to requesting clients. The license apparatus may thus allocate licenses up to a maximum number permitted, as calculated or determined according to information within dataset 710.

Status apparatus 730 is configured to determine and/or track the status of peer controller nodes, particularly those nodes for which controller node 700 is designated as a backup or beneficiary.

Communication apparatus 740 is configured to exchange communications with external entities, including clients and other controller nodes. Such communications may include license requests, access requests to licensed content, keep-alive messages, status queries to/from other nodes, etc.

Figure 8:
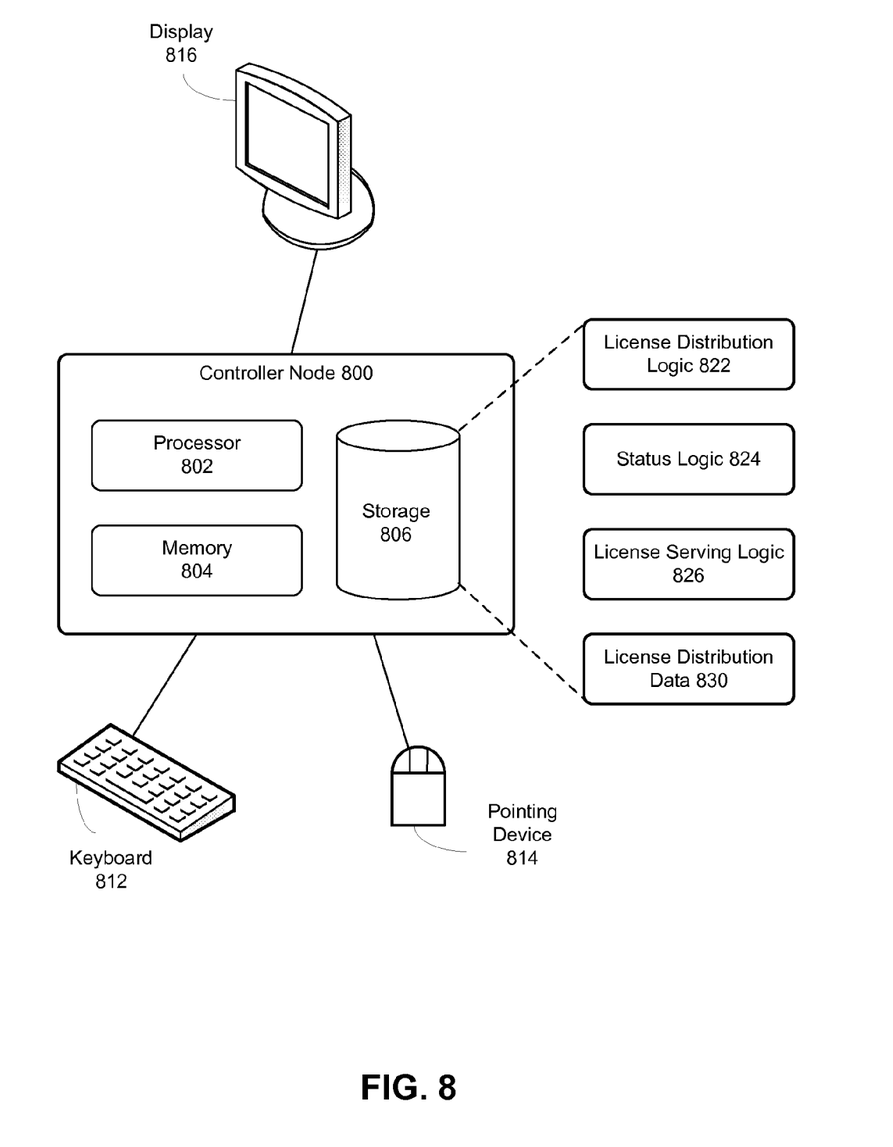
FIG. 8 is a block diagram of a license controller for redistributing a failed controller's pool of licenses among other controllers, according to some embodiments of the invention.

FIG. 8 is a block diagram of a controller node that may be employed to facilitate distribution or redistribution of a pool of licenses among a set of license controllers when one controller becomes unavailable, according to some embodiments of the invention.

Controller node 800 of FIG. 8 comprises processor 802, memory 804 and storage 806, which may comprise one or more optical and/or magnetic storage components. Network intermediary 800 may be coupled (permanently or transiently) to keyboard 812, pointing device 814 and display 816.

Storage 806 of the network intermediary stores various logic or code that may be loaded into memory 804 for execution by processor 802. Such logic includes license distribution logic 822, status logic 824 and license serving logic 826. Storage 806 may also store data for manipulation and use of processor 802, such as license distribution data 830.

License distribution logic 822 comprises processor-executable instructions for determining how many licenses controller node 800 is permitted to allocate or serve to clients at a given time. Execution of license distribution logic 822 may require manipulation of data 830. Content associated with the controller's licenses may be stored on the controller or on a separate entity (e.g., an application server, a content server).

Status logic 824 comprises processor-executable instructions for determining or tracking statuses of other controller nodes (e.g., peers of node 800). Execution of logic 824 may entail issuing query or status messages to one or more controller nodes and/or replying to such messages from other nodes.

License serving logic 826 comprises processor-executable instructions for allocating or serving licenses to clients, up to a maximum number permitted, which may be calculated by license distribution logic 822 using data 830.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of redistributing licenses for accessing electronic content, the method comprising:
   distributing a total number of licenses for the electronic content among a plurality of nodes;
   at each node in the plurality of nodes, allocating up to a maximum number of licenses in response to license requests, wherein a given node's maximum number of licenses is initially equal to a default number of licenses specified for the given node;
   detecting unavailability of a first node;
   before responding to another license request, redistributing the first node's default number of licenses among one or more backup nodes, wherein said redistributing comprises, for each of the one or more backup nodes:
      identifying a percentage of the first node's default number of licenses to redistribute to the backup node; and
      increasing the backup node's maximum number of licenses by the identified percentage of the first node's default number of licenses;
   detecting availability of the first node after said redistributing;
   at each of the one or more backup nodes:
      calculating a first difference between the backup node's maximum number of licenses and either the number of licenses currently allocated by the backup node or the backup node's default number of licenses, whichever is less; and
      decreasing the backup node's maximum number of licenses by the amount the backup node's maximum number of licenses was increased in said increasing;
   calculating a sum of all said first differences; and
   setting the maximum number of licenses the first node can allocate to entities requesting access to the content equal to said sum.

2. The method of claim 1, further comprising:
   detecting availability of the first node after said executing;
   at the first node, allocating up to the first node's default number of licenses to entities requesting access to the content; and
   at each of the one or more backup nodes, decreasing the backup node's maximum number of licenses by the amount the backup node's maximum number of licenses was increased in said increasing.

3. The method of claim 1, further comprising, after said setting:
   for each backup node that is currently allocating a number of licenses greater than the backup node's default number of licenses, detecting decreases in the backup node's currently allocated number of licenses; and
   in response to said detecting decreases, increasing the maximum number of licenses the first node can allocate to entities requesting access to the content.

4. The method of claim 1, further comprising:
   distributing to each node in the plurality of nodes a dataset comprising each node's default number of licenses.

5. The method of claim 4, wherein:
   said dataset further comprises a redistribution plan comprising a set of weighted arcs; and
   each said weighted arc comprises:
      an identity of a third node;
      an identity of a second node that will receive a portion of the third node's default number of licenses in the event the third node becomes unavailable; and
      a weight, wherein said weight is configured to identify a size of the portion.

6. The method of claim 4, wherein:
   said dataset further comprises a multi-level hierarchical redistribution plan, wherein each level of the redistribution plan comprises a set of weighted arcs; and
   each said weighted arc comprises:
      an identity of a prospective failed node;
      an identity of a beneficiary node that will receive a portion of the prospective failed node's default number of licenses in the event the prospective failed node becomes unavailable; and
      a weight, wherein said weight corresponds to a size of the portion; and
   said redistributing comprises selecting a highest level of the plan at which a first weighted arc identifying the first node as said prospective failed node identifies an available node as said beneficiary node.

7. The method of claim 6, wherein said identifying a percentage of the first node's default number of licenses to redistribute to the backup node comprises:
   identifying said weight of the first weighted arc.

8. The method of claim 6, wherein said identifying a percentage of the first node's default number of licenses to redistribute to the backup node further comprises:

adjusting said weight if said weight corresponds to a portion of the first node's initial number of licenses that the available node cannot support.

9. A method of redistributing licenses for accessing electronic content, the method comprising:

distributing to each node in a plurality of nodes a dataset comprising:
- each node's default number of licenses for the electronic content; and
- a redistribution plan comprising a set of weighted arcs, each said weighted arc comprising:
  - an identity of a first node;
  - an identity of a second node that will receive a portion of the first node's default number of licenses in the event the first node becomes unavailable; and
  - a weight configured to identify a size of the portion;

at each node in the plurality of nodes, allocating up to a maximum number of licenses in response to license requests, wherein a given node's maximum number of licenses is initially equal to the default number of licenses specified for the given node;

detecting unavailability of a third node; and before responding to another license request, redistributing the third node's default number of licenses among one or more backup nodes, wherein said redistributing comprises, for each of the one or more backup nodes:
- identifying a percentage of the third node's default number of licenses to redistribute to the backup node; and
- increasing the backup node's maximum number of licenses by the identified percentage of the third node's default number of licenses.

10. The method of claim 9, wherein:

said dataset further comprises a multi-level hierarchical redistribution plan, wherein each level of the redistribution plan comprises a set of weighted arcs; and each said weighted arc comprises:
- an identity of a prospective failed node;
- an identity of a beneficiary node that will receive a portion of the prospective failed node's default number of licenses in the event the prospective failed node becomes unavailable; and
- a weight, wherein said weight corresponds to a size of the portion; and said redistributing comprises selecting a highest level of the plan at which a first weighted arc identifying the third node as said prospective failed node identifies an available node as said beneficiary node.

11. The method of claim 10, wherein said identifying a percentage of the third node's default number of licenses to redistribute to the backup node comprises:

identifying said weight of the first weighted arc.

12. The method of claim 10, wherein said identifying a percentage of the third node's default number of licenses to redistribute to the backup node further comprises:

adjusting said weight if said weight corresponds to a portion of the third node's initial number of licenses that the available node cannot support.

13. The method of claim 9, further comprising:

detecting availability of the third node after said executing;

at the third node, allocating up to the third node's default number of licenses to entities requesting access to the content; and at each of the one or more backup nodes, decreasing the backup node's maximum number of licenses by the amount the backup node's maximum number of licenses was increased in said increasing.

14. The method of claim 9, further comprising:

detecting availability of the third node after said redistributing;

at each of the one or more backup nodes:
- calculating a first difference between the backup node's maximum number of licenses and either the number of licenses currently allocated by the backup node or the backup node's default number of licenses, whichever is less; and
- decreasing the backup node's maximum number of licenses by the amount the backup node's maximum number of licenses was increased in said increasing;

calculating a sum of all said first differences; and setting the maximum number of licenses the third node can allocate to entities requesting access to the content equal to said sum.

15. The method of claim 14, further comprising, after said setting:

for each backup node that is currently allocating a number of licenses greater than the backup node's default number of licenses, detecting decreases in the backup node's currently allocated number of licenses; and in response to said detecting decreases, increasing the maximum number of licenses the third node can allocate to entities requesting access to the content.

* * * * *